(No Model.)

W. G. BELL.
SAUSAGE FILLER.

No. 248,838.　　　　　　　　　Patented Nov. 1, 1881.

Witnesses:
Henry Chadbourn.
Jas. W. Watson.

Inventor:
William G. Bell.
by Alban Andrén.
his atty.

United States Patent Office.

WILLIAM G. BELL, OF BOSTON, MASSACHUSETTS.

SAUSAGE-FILLER.

SPECIFICATION forming part of Letters Patent No. 248,838, dated November 1, 1881.

Application filed August 12, 1881. (No model.)

*To all whom it may concern:*

Be it known that I, WILLIAM G. BELL, a citizen of the United States, residing at Boston, in the county of Suffolk and State of Massachusetts, have invented certain new and useful Improvements in Sausage-Fillers; and I do hereby declare that the same are fully described in the following specification and illustrated in the accompanying drawings.

This invention relates to improvements on the patent granted January 23, 1872, to J. Edson and William G. Bell for sausage-fillers; and it consists in arranging the trunnions on the cylinder, around which it is adapted to swing, above the axial line of said cylinder, by which arrangement I am able to dispense with the usual locking or fastening device at the mouth of said cylinder for holding it firmly in a horizontal position during the forward motion of the piston. By locating the said trunnions above the axial line of the cylinder the latter is suspended above its center of gravity, and this is one of the reasons why it is kept in a horizontal position without the aid of a locking device; and, secondly, by the arrangement of said trunnions, as above described, the axial line of the movable piston is caused to exert its pressure on the meat below the axial line of support of the trunnions, and this has an additional tendency to hold the cylinder in a horizontal position during the forward motion of the piston, as will hereinafter be more fully shown and described, reference being had to the accompanying drawings, on which—

Figure 1:
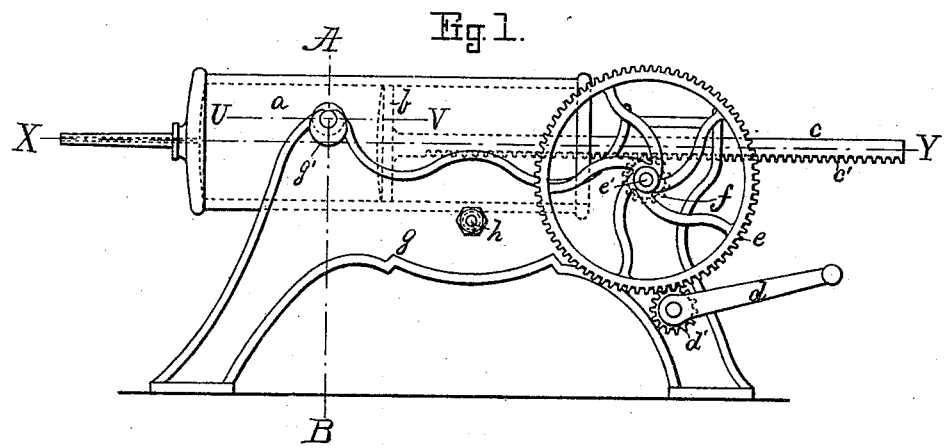
Figure 2:
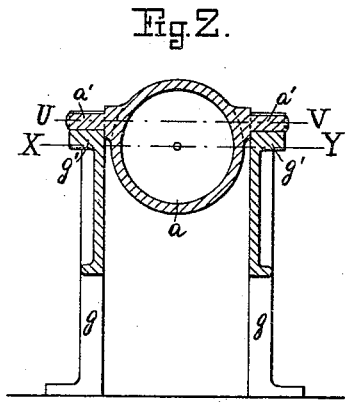

Figure 1 represents a side elevation of my improved sausage-filler, and Fig. 2 represents a cross-section on the line A B, shown in Fig. 1.

Similar letters refer to similar parts wherever the occur on the different parts of the drawings.

$a$ represents the cylinder, and X Y represent its axial line. $b$ represents the movable piston, and $c$ represents its piston-rod, as usual, provided with the cog-rack $c'$.

$d$ is the crank with its pinion $d'$ geared into the gear-wheel $e$ on the shaft $e'$, to which is also secured the pinion $f$, gearing into the cog-rack $c'$, in the usual manner.

$g\ g$ are the frames for the machine, having bearings $g'\ g'$ for the trunnions $a'\ a'$ attached to the two opposite sides of the cylinder $a$, as shown.

U V is the axial line of the trunnions $a'\ a'$, and said line is arranged above the axial line X Y of the cylinder $a$, as and for the purpose set forth.

$h$ is the lower supporting-bolt for the front end of the cylinder $a$, as usual.

Having thus fully described the nature, construction, and operation of my invention, I wish to secure by Letters Patent, and claim—

In a sausage-filler, the cylinder $a$, having the axial line of its trunnions $a'\ a'$ arranged above the axial line of said cylinder, and provided with the support $h$, as and for the purpose set forth.

In testimony whereof I have affixed my signature in presence of two witnesses.

WILLIAM G. BELL.

Witnesses:
ALBAN ANDRÉN,
HENRY CHADBOURN.